J. B. PLATO.
HITCHING DEVICE.
APPLICATION FILED DEC. 26, 1905.
986,591.
Patented Mar. 14, 1911.
2 SHEETS—SHEET 2.
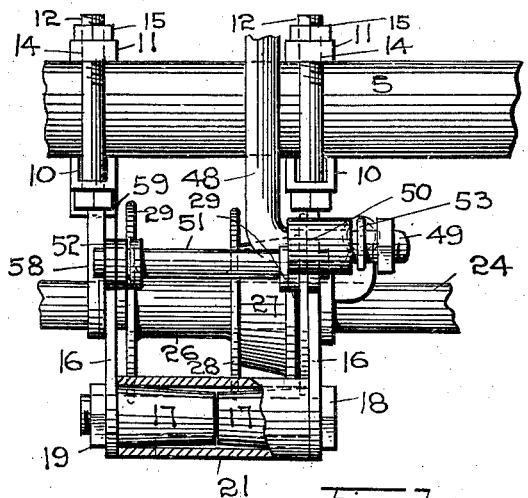
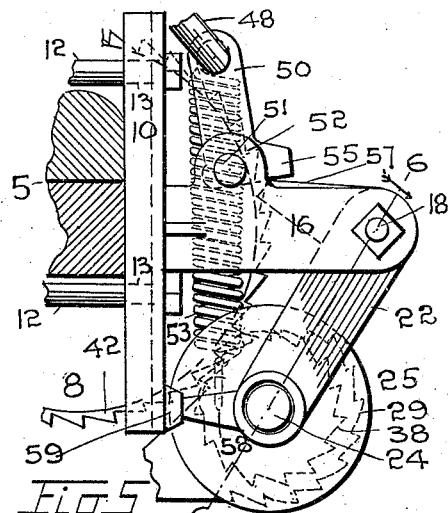
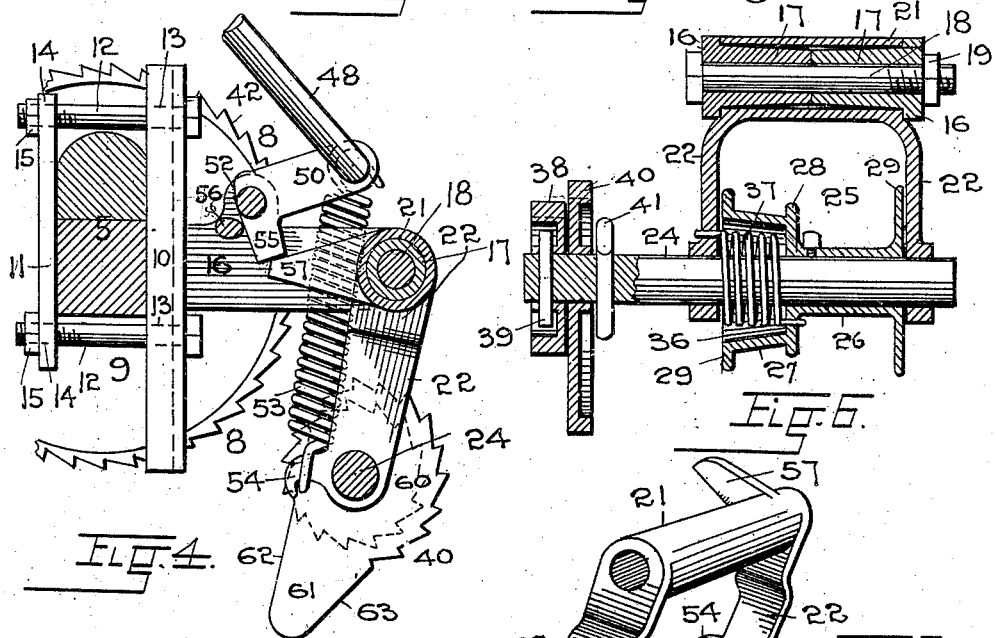
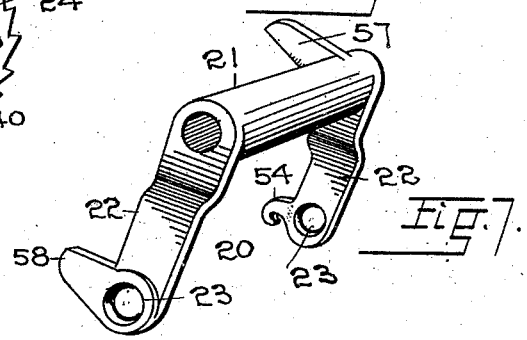
WITNESSES:
INVENTOR.
John B. Plato
BY
ATTORNEY

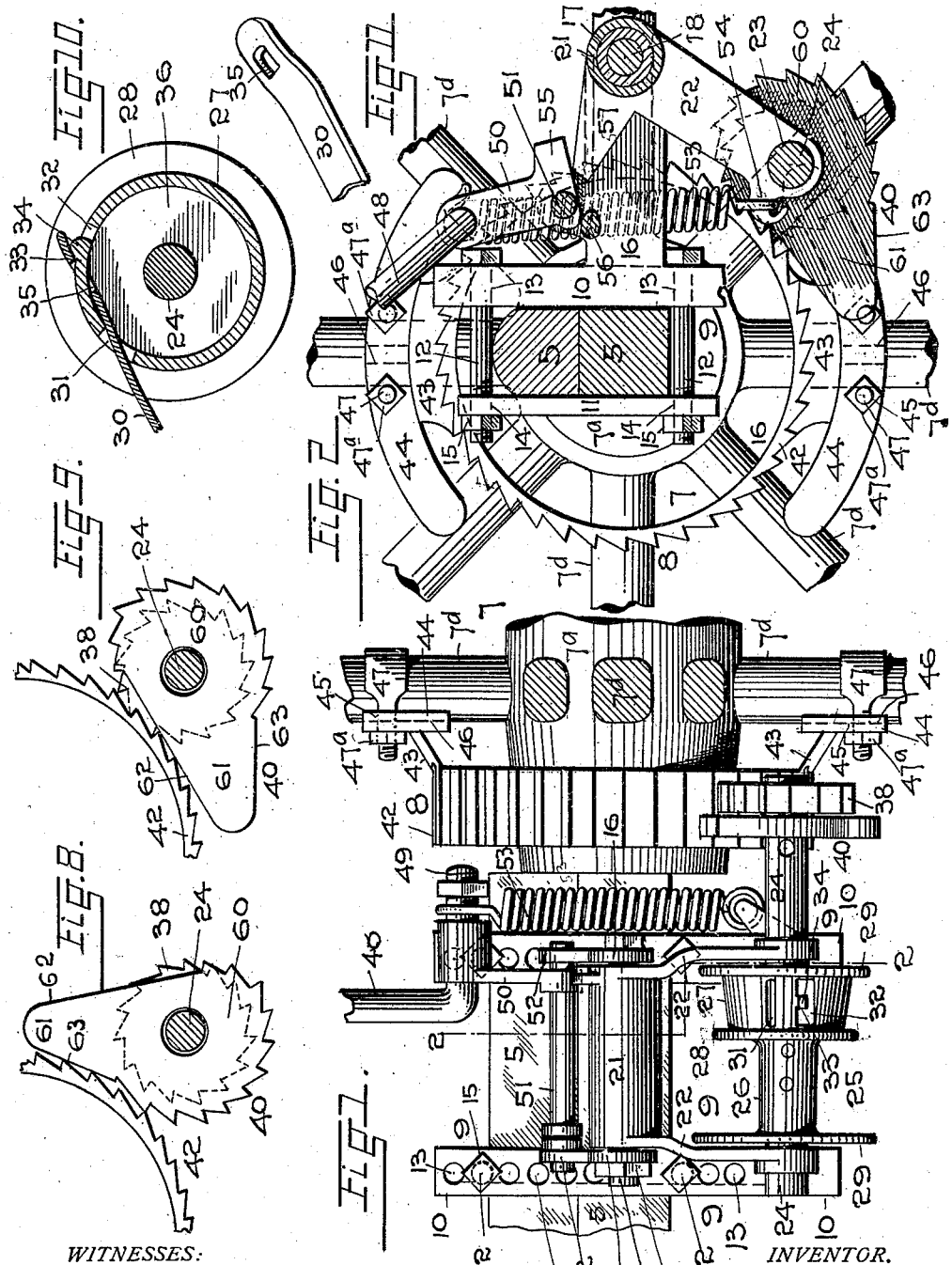

UNITED STATES PATENT OFFICE.

JOHN B. PLATO, OF DENVER, COLORADO.

HITCHING DEVICE.

986,591.  Specification of Letters Patent.  Patented Mar. 14, 1911.

Application filed December 26, 1905. Serial No. 293,332.

*To all whom it may concern:*

Be it known that I, JOHN B. PLATO, citizen of the United States of America, residing at Denver, in the county of Denver and State of Colorado, have invented certain new and useful Improvements in Hitching Devices, of which the following is a specification.

This invention relates to devices for hitching draft animals and more particularly to that class of devices in which a strap attached to the animal's bit or reins is made to wind around a conveniently located drum during forward movement of the horse, by action of two gears, one of which is mounted on a wheel of the wagon while the other, being secured to the drum-shaft, may be brought in mesh with the first named gear by suitable operating means under control of the occupant of the vehicle.

Of the many advantages derived from my invention and which will be fully set forth in this specification, the following are of chief importance:—When, after the gears are brought in mesh, the horse starts forward, the strap will be wound rapidly for a limited period, after which, if the animal persists in moving forward, the winding of the strap will proceed at a slower rate; the contact between the gears being resilient, obstructions such as rocks or dirt may pass between them without damaging the mechanism of the device; by arrangement of parts, as will hereinafter be described, the operator may bring the gears out of mesh, even when the strap is under tension; if, after forward movement the animal "backs," the strap will instantly and automatically unwind; accidental engagement of the gears is impossible; when the gears are in mesh the mechanism is automatically locked without fastening the rod leading to the driver's seat.

The device may be rapidly adjusted to the axle of any wagon irrespective of its construction.

With these objects in view I make use of the mechanism illustrated in the accompanying drawings, in the various views of which like parts are similarly designated and in which—

Figure 1— represents an elevation of my device as attached to the wheel and axle of a vehicle, looking toward the front. Fig. 2— a longitudinal cross section taken along a line 2—2, Fig. 1, looking toward the wheel. Fig. 3— a plan view of the device, the gears being omitted. Fig. 4— a cross section taken along the line 2—2, Fig. 1, the parts being in the unlocked position and the wagon wheel omitted. Fig. 5— a fragmentary end view of the device in the locked position, looking toward the wheel which has been omitted. Fig. 6— a section taken along a line 6—6, Fig. 5, looking in the direction of the arrow. Fig. 7— a perspective view of the swinging drum-supporting frame. Figs. 8 and 9— respectively, fragmentary views of the cam, pinion and gear wheel in their relative positions during backward and forward movement of the vehicle. Fig. 10— a cross section through the winding drum, and Fig. 11— a perspective view of the drum-end of the hitching strap.

It will be understood that, inasmuch as the arrangement of the forward extremities of the hitching strap and the operating rod is obvious, the illustration of the vehicle has been limited to such portions of the wheel and axle as are in immediate contact with the members of my device.

Referring to the drawings, 5 represents the rear vehicle axle and 7 one of the rear wheels, comprising the hub 7$^a$ and the spokes 7$^d$.

The device consists of two normally separated members, viz, the large annular gear wheel 8, which in practice is secured to the wheel 7 and the drum and rock-shaft supporting clamp-brackets 9 adapted to be secured to the axle in operative relation to the gear. Clamp-brackets 9, of which there are two, consist of two clamp-cheeks 10 and 11, placed at opposite sides of the vehicle axle and connected by bolts 12 which, being located respectively above and below the axle, each passes through one of a plurality of superposed apertures 13 in cheeks 10 and corresponding openings 14 in cheeks 11. The various parts thus assembled are rigidly clamped on the axle by nuts 15 screwed onto the protruding extremities of the bolts while the plurality of bolt-holes 13 permits vertical adjustment and adapts the brackets to be secured to axles of varying size. Laterally extending from clamp-cheeks 10 are, in practice, the parallel arms 16, the outer extremities of which have been provided with integral reversely and inwardly extending, longitudinal apertured bosses 17, which, contacting at their opposite extremities, determine the distance between the two brackets and form a bearing for the swinging drum-frame which will hereinafter be described. A bolt 18 passing through the apertures in the bosses and secured by a nut 19, holds the outer extremities of arms 16 against displacement.

Numeral 20 designates the before mentioned U-shaped swinging drum-frame consisting of a sleeve 21, in practice, loosely mounted on bosses 17 of arms 16, and the pendent parallel arms 22, the lower extremities of which, having apertures 23, form bearings for the drum-shaft 24. Rigidly secured to the latter and located between the arms 22 of the U-shaped frame is the flanged winding drum 25, having two contiguous faces 26 and 27 of different diameters and separated by the intermediate flange 28 which preferably, is diametrically smaller than the outer flanges 29. The strap 30, leading to the draft animal is secured to the periphery of the hollow largest section 27 of the drum, which to this end has been provided with two parallel slots 31 and 32 into the latter of which extends a projection 33 terminating in an outwardly facing protuberance or knob 34. The drum end of the hitching strap to be secured to the drum, is inserted through slot 31 and projecting outwardly through slot 32 is held by the knob 34 which, to this end, is inserted in a correspondingly shaped aperture 35, cut in the extreme end of the strap. The drum is furthermore provided at its largest end with a cylindrical recess 36, which houses a spiral spring 37, placed around the drum-shaft and secured at its opposite extremities respectively to the drum and to the adjacent arm 22 of the drum-frame 20. When the drum revolves during forward movement of the vehicle, the spring is brought under tension and aids in unwinding the strap, when the gears are forced out of mesh.

Pinion 38, which, when engaging the large gear-wheel 8 causes rotation of the drum, is mounted at the extreme end of the drum-shaft 24, being rigidly secured thereto by a pin 39 which being driven through a hole in the shaft, extends in diametrically opposite slots in the hub of the pinion. Loosely mounted on the same shaft and adjoining the pinion is a cam 40, which in principle and purpose, is similar to the elliptical mutilated cam-gear described in my application for patent, Serial #258,028, filed in the United States Patent Office April 29–1905 and allowed Oct. 16–1905. A pin 41 secured in an opening in the shaft holds the cam and incidentally the pinion, against lateral displacement. The large gear 8 consists of the annular, externally toothed rim 42, provided with two diametrically opposite lugs 43 by means of which it is secured to the wheel. Lugs 43 terminate in segmental plates 44, provided with apertures 45, at equal distances from the diametrically disposed centering grooves 46. When secured to the wheel, the grooves 46 are brought to engage diametrically opposite spokes of the wheel, while the extremities of the segmental plates 44, contact with the adjacent spokes. This arrangement greatly aids in centering the gear on the wheel, upon which it is held in place by U-shaped clips 47, which embrace the spokes engaged by grooves 46 and, extending through apertures 45, are held by nuts 47ᵃ.

The width of rim 42 is made to exceed the combined widths of pinion 38 and cam-gear 40, to permit the two to simultaneously engage the peripheral teeth of gear 8.

The drum-shaft 24 being journaled in the fulcrumed frame 20, is adapted to be moved in an arcuate path for the purpose of bringing pinion 38 in and out of engagement with gear 8. In this connection it will be noted that contrary to the arrangement shown in the prior above named application, the drum-shaft remains at all times in parallel relation to the vehicle axle.

The change in positions of the drum shaft and the thereto secured pinion is controlled by means of a rod 48, one end of which extends within reach of the occupant of the vehicle, while its opposite extremity 49, being bent at right angles, is movably secured to the extreme end of the upwardly extending crank-arm 50 of a rock-shaft 51, which is journaled in oppositely disposed, apertured lugs 52 on arms 16 of the clamp brackets 9. The crank-arm 50 is connected to the lower extremity of the swinging frame 20 by a coil-spring 53 the upper extremity of which is secured around the protruding end of rod 48, while its opposite end engages a hook-shaped projection 54 on the adjacent arm 22 of frame 20.

When gear 8 and pinion 38 are out of mesh and the device is in its open or unlocked position, the crank-arm 50 and the thereto attached rod 48 are in their rear and lowermost position which location is determined by the engagement of a short arm 55 extending from the rock-shaft, and a stop 56 on the arm 16 of the adjacent clamp-bracket. The arm 55 when in this position, furthermore engages the upper edge of an inwardly projecting arm 57 on sleeve 21 of the swinging drum frame, thereby effectually preventing accidental engagement of the gears during movement of the vehicle. As the tension of the spring tends to hold the above named parts in constant contact, the above described arrangement will furthermore keep the movable parts of the device from rattling which obviously is of importance when employed on carriages and other light vehicles.

To bring the gears into mesh, rod 48 is pulled forward until the crank-arm has passed its fulcrum (see Fig. 2), in which position it will be maintained by the tension of spring 53 which not only tends to draw the extremities of arm 50 and frame 20 together but, incidentally, establishes resilient engagement of the gears which permits the passing between of rocks and other obstructions which during movement of the vehicle are constantly raised from the road.

It will be observed that the above described manner of locking the parts obviates the use of fastening means for the forward end of rod 48, which only requires a suitable support or guide, such as the hand-loop usually found on express and delivery wagons, to hold it in position.

If, after the gears have been brought in mesh the horse starts forward, strap 30 is at once brought under tension, a condition, which under ordinary circumstances, practically prevents subsequent disengagement of the gears unless the strap be relieved of the strain by backing the vehicle. This difficulty is overcome in my apparatus by the before mentioned arms 55 and 57, which remain in engagement after the position of arm 50 on the rock-shaft has been reversed. When rod 48 is pushed backward to disengage the gears, arm 55, engaging the upper edge of arm 57 will force the latter downward with the result that the lower extremity of the swinging frame and with it the drum shaft and thereto secured pinion is moved outwardly irrespective of the tension on strap 30. Frame 20 is furthermore provided with a second arm or projection 58 which extends inwardly from the lower extremity of the arm 22 remote from the gears, and which, when the latter are in mesh engages a stop 59 on the clamp-cheek 10 of the adjacent clamp-bracket 9. This arrangement is intended to prevent binding of the gears and drum shaft, when the strap is under tension, while it incidentally facilitates the adjustment of the device on the vehicle axle. When the large gear is in place on the wheel and the clamp-cheeks in engagement with the axle, the brackets may instantly be placed in the proper position by swinging the lower extremity of frame 20 inwardly until arm 58 and stop 59 are engage, after which the brackets are adjusted until the gears are in mesh. The clamps are then secured by tightening nuts 15 and the apparatus is ready for operation.

Cam 40 which, as heretofore explained, is mounted on shaft 24 in juxtaposition to pinion 38, consists of an eccentric wheel 60, the outer periphery of which has been provided with teeth corresponding to those on the gears and which has an elongated extension 61, the edges 62 and 63 of which are preferably tangent to the root circle of the teeth. Under normal conditions when the gears are out of mesh the extension performs the function of a counter-weight to retain the cam in position (see Fig. 4), but the moment the horse starts forward after the gears have been brought in mesh, the engagement of the teeth of the large gear with those of the cam, which at the portion of its face adjacent to gear 8 are in line with the teeth of the pinion, will cause it to revolve in opposite direction until the tangent edge 62 comes in engagement with the teeth of gear 8, in which position it remains during further forward movement of the wheel (see Fig. 9).

While the horse moves forward the strap being wound upon the drum, exerts a backward pull on its head, which as a natural consequence will cause the animal to reverse its movement and back against the vehicle, pushing it in opposite direction and, unless the efforts of the animal to release the tension on the strap be productive of the desired result, serious damage to property and perhaps bodily injury to passersby will be the natural result. This, however, is in my apparatus, prevented by the cam 60 the teeth of which as soon as the direction of rotation of wheel 7 is reversed, will once more engage those of gear 8. Owing to its eccentric position on the shaft, the cam will, during further rotation of the gear, force the drum-shaft away from the vehicle axle, until the teeth of pinion 38 are brought out of mesh with those of the large gear, in which position it is maintained by the engagement of the tangential edge 63 with the periphery of gear 8 (see Fig. 8). The moment the gears are out of engagement the pull exerted by the animal on the strap, augmented by the relaxation of spring 37, will reverse the movement of the drum-shaft and cause the strap to unwind. As during subsequent forward movement of the vehicle the teeth of the cam will at once engage those of the gear 8 and permit the pinion to come in engagement therewith, it will be observed that the apparatus, even when the cam is in the position illustrated in Fig. 8, is in condition to instantly wind the strap when the horse pulls the vehicle forward.

The teeth of the two gear wheels as well as of the cam are, as shown in the drawings, of ratchet shape, this form of tooth being best suited to the purpose. It should be understood, however, that wheels provided with differently shaped teeth, or even friction wheels may be employed with satisfactory results.

It will be observed that in addition to the various means of adjustment heretofore described, the position of the pinion and cam in respect to the gear wheel may furthermore be adjusted by moving shaft 24 longitudinally.

As the functions of the various parts of the apparatus have been described more or less in detail in the foregoing part of the specification, the description of the operation of the apparatus may be limited to few words.

After the apparatus has been attached to the vehicle wheel and axle in the manner previously described, the strap leading from the largest peripheral surface of the drum is attached either to the animal's bit, reins or checkrein and the rod attached to the crank-arm on the rock-shaft, supported in any convenient manner along the side of the wagon box, to terminate within reach of the driver. When leaving the vehicle or in case he loses control over the animal, the occupant of the vehicle pulls the rod forward, thereby bringing the gears in engagement and causing the strap to wind on the diametrically largest section of the double drum. This will cause a rapid pull to be exerted on the horse's head until the wound-up strap has reached a point above the intermediate flange 28, when it will pass over onto the reduced portion 27 of the drum with the result that, during further forward movement, the strap is wound with less speed. This feature of my device effectually obviates all danger of injury to the animal's head, mouth or neck, while the diameter of the intermediate flange determines the length of strap to be wound around the largest periphery.

The fact that my device is usually located at one side of the wagon and the strap leads to the center, aids materially in passing the strap from one section of the drum on to the other.

Should the animal, owing to the persistent pull on its head, reverse its movement and back the vehicle, the action of the cam will cause the instant disengagement of the gears and subsequent unwinding of the strap as heretofore explained, while to "unlock" the device the driver merely pushes the rod into its original position. The arrangement of spring 53 prevents displacement of the parts in either of the three positions, the constant engagement of arms 55 and 57 prevents rattling and accidental engagement of the gears and aids in unlocking the device, while the contact between arm 58 and lug 59, prohibits binding of the gears irrespective of the tension of strap 30.

Having thus described my invention what I claim is:—

1. The combination with a vehicle and a gear wheel fixed on one of its wheels, of a shaft movably mounted on said vehicle, a pinion on the shaft adapted to engage the gear, and a drum mounted on said shaft having two faces of different diameters separated by a flange, and flanges at its ends whose diameters exceed that of the intermediate one.

2. The combination with a vehicle and a gear wheel fixed on one of its wheels, of a shaft movably mounted on said vehicle, a pinion on the shaft adapted to engage the gear, and a hollow drum on said shaft having an opening in its circumferential wall and a hook arranged in operative relation thereto, and a strap passing through the said opening and having perforations to engage the said hook.

3. The combination with a vehicle and a gear-wheel fixed on one of its wheels, of a shaft movably mounted on said vehicle, a pinion on the shaft adapted to engage the gear, and a drum on said shaft and having two parallel peripheral openings and a hook extending into one of them, and adapted to hold the apertured end of a strap or chain.

4. The combination with a vehicle and a gear-wheel fixed to a wheel thereof, of a revoluble shaft, movably mounted on said vehicle, a pinion on the shaft adapted to engage the gear-wheel, and a cam loosely mounted on the shaft, adapted to engage the gear-wheel and comprising an eccentric toothed portion and an extension, the edges of which are plain.

5. The combination with a vehicle and a gear-wheel mounted on one of its wheels, of a revoluble shaft movably mounted on said vehicle, a pinion on said shaft adapted to engage the gear, and a cam loosely mounted on said shaft, adapted to engage the gear-wheel and comprising an eccentric toothed portion and an elongated extension, the edges of which are plain and tangent to the root-circle of the teeth.

6. The combination with a vehicle and a gear-wheel fixed to one of its wheels, of a revoluble shaft movably mounted on said vehicle, a pinion on said shaft adapted to engage the gear, and a cam loosely mounted on the shaft, adapted to disengage said gears during rearward movement of the vehicle and to continually maintain them in the separated position until the movement is reversed.

7. The combination with a vehicle and a gear-wheel fixed on one of its wheels, of a swinging frame fulcrumed on said vehicle, a shaft journaled in said frame, a rock-shaft, a tensile connection between an arm on the latter and the frame, said rock-shaft having a projecting member, engaging an arm on said frame.

8. The combination with a vehicle and a gear-wheel fixed on one of its wheels, of a swinging frame fulcrumed on said vehicle, a shaft journaled in said frame, a rock-shaft, a tensile connection between an arm on the latter and the frame, and means on said rock-shaft to limit the inward movement of the frame while the gears are disengaged.

9. The combination with a vehicle and a gear-wheel fixed on one of its wheels, of a swinging frame fulcrumed on said vehicle, a shaft journaled in said frame, a rock-shaft, a tensile connection between an arm on the latter and the frame, and means on said rock-shaft to engage said frame and force it outwardly when the gears are in engagement.

In testimony whereof I have affixed my signature in presence of two witnesses.

JOHN B. PLATO.

Witnesses:
G. J. ROLLANDET,
K. M. STUMP.

Copies of this patent may be obtained for five cents each, by addressing the "Commissioner of Patents, Washington, D. C."